United States Patent

Oprescu-Surcobe et al.

(10) Patent No.: US 6,636,745 B2
(45) Date of Patent: Oct. 21, 2003

(54) METHOD AND APPARATUS TO SHORTEN CALL-SETUP TIME

(75) Inventors: Valentin Oprescu-Surcobe, Northbrook, IL (US); John M. Harris, Chicago, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 183 days.

(21) Appl. No.: 09/928,129

(22) Filed: Aug. 10, 2001

(65) Prior Publication Data

US 2003/0171125 A1 Sep. 11, 2003

(51) Int. Cl.[7] .................................. H04Q 7/20
(52) U.S. Cl. ............... 455/458; 455/426.1; 455/343.2; 455/574; 370/311
(58) Field of Search ......................... 455/426.1, 455, 455/458, 517, 518, 519, 343.2, 574, 515; 370/311, 320, 321, 335, 336, 342, 347

(56) References Cited

U.S. PATENT DOCUMENTS

| | | | |
|---|---|---|---|
| 6,072,987 A | | 6/2000 | Willey |
| 6,138,034 A | | 10/2000 | Willey |
| 6,216,004 B1 | | 4/2001 | Tiedemann, Jr. et al. |
| 6,317,607 B1 | * | 11/2001 | Tomcik et al. ............ 455/426 |
| 6,519,239 B1 | * | 2/2003 | Panchal et al. ............ 455/519 |

FOREIGN PATENT DOCUMENTS

WO    WO 99 67972 A    12/1999

OTHER PUBLICATIONS

Sarkar, S. et al. "Phone Standby Time and The Quick Paging Channel." *IEEE International Symposium on Personal, Indoor and Mobile Radio Communications*; vol. 3, Sep. 1999, pp. 1341–1345.

Sarkar, S. et al. "Soft Handoff on the Quick Paging Channel." *IEEE Global Telecommunications Conference—Globecom '99*, pp. 2794–2798.

* cited by examiner

*Primary Examiner*—Quochien Vuong
(74) *Attorney, Agent, or Firm*—Jeffrey K. Jacobs

(57) ABSTRACT

To address the need for a communication unit, a communication infrastructure, and method that shorten call-setup time while still providing the benefit of the QPCH, the present invention provides a communication unit (e.g., 103) that sends a page response before receiving a page message from the communication infrastructure, based on the values of the QPCH indicators. This "preemptive" page response shortens call-setup time. Because several communication units may send page responses before verifying whether they specifically are being paged, the infrastructure (e.g., 108–110) determines which page responses are valid (and processes them further) and which are false (and discards them).

18 Claims, 3 Drawing Sheets

METHOD AND APPARATUS TO SHORTEN CALL-SETUP TIME

FIELD OF THE INVENTION

The present invention relates generally to the field of wireless communications and, more particularly, to shortening call-setup time in wireless communication systems that page call participants.

BACKGROUND OF THE INVENTION

Many battery powered communication units have a sleep mode in which they are able to conserve power by powering down components such as their receivers. These communication units then "wake up" periodically to determine if any messages (pages) are going to be transmitted to them. If there are no messages that the communication unit needs to receive, it will power down in order to extend its battery life. Next generation Code-Division Multiple-Access (CDMA) cellular communication systems, more commonly referred to as CDMA 2000 or Wideband CDMA systems, incorporate such power saving techniques. Each communication unit within a CDMA 2000 system is normally able to determine to which group of four, 20 millisecond (ms), synchronous frames on its paging channel (PCH) it is assigned. This group of frames, referred to as its "paging slot," is used by the infrastructure to transmit messages to the particular unit. Thus, a communication unit in so-called "slotted mode" operation exits its sleep mode in order to monitor transmissions associated with its assigned paging slot. The more quickly a communication unit can determine that it has no messages or no more messages to receive, the more quickly it can return to sleep mode and conserve power, further extending its battery life.

CDMA 200 also incorporates a Quick Paging Channel (QPCH) to reduce the time a communication unit must monitor the PCH. QPCH slots comprise four, 20 millisecond (ms), synchronous frames. However, QPCH frames are transmitted 100 ms earlier than their corresponding PCH slot. A couple of paging indicator bits are transmitted in the QPCH slot that tell each communication unit whether it may be addressed by any of the upcoming PCH messages. Because the QPCH does not employ error correction coding or interleaving as the PCH does, the time required for a communication unit to receive and process its bits is small compared to the time required to monitor the PCH slot. Thus, the QPCH allows communication units to determine whether they need to monitor the upcoming corresponding PCH slot at all. Normally, a large number of communication units determine, based on the QPCH indicators, that they do not need to monitor the PCH during the upcoming corresponding slot and they can rapidly re-enter a "sleep mode," where battery power is conserved.

While the QPCH enables communication units to save battery life, it also introduces 100 ms of delay (on average) to call-setup time. For dispatch calls, however, call-setup time is very important. A dispatch user expects to "push-to-talk" and begin conversing with other call participants in a very short period of time, usually 1 second or less. Thus, a communication unit, a communication infrastructure, and method that shorten this call-setup time while still providing the benefit of the QPCH are needed.

DESCRIPTION OF A PREFERRED EMBODIMENT

To address the need for a communication unit, a communication infrastructure, and method that shorten call-setup time while still providing the benefit of the QPCH, the present invention provides a communication unit that sends a page response before receiving a page message from the communication infrastructure, if all the QPCH indicators related to the communication unit were unambiguously received and they indicate the possibility for the communication unit to be paged in the upcoming corresponding PCH slot. This "preemptive" page response shortens call-setup time by the time that a communication unit would otherwise be monitoring its paging slot for a page message specifically addressed to itself. Because many communication units will send page responses before verifying whether they specifically are being paged, the infrastructure must determine which page responses are valid and which are false.

Figure 1:
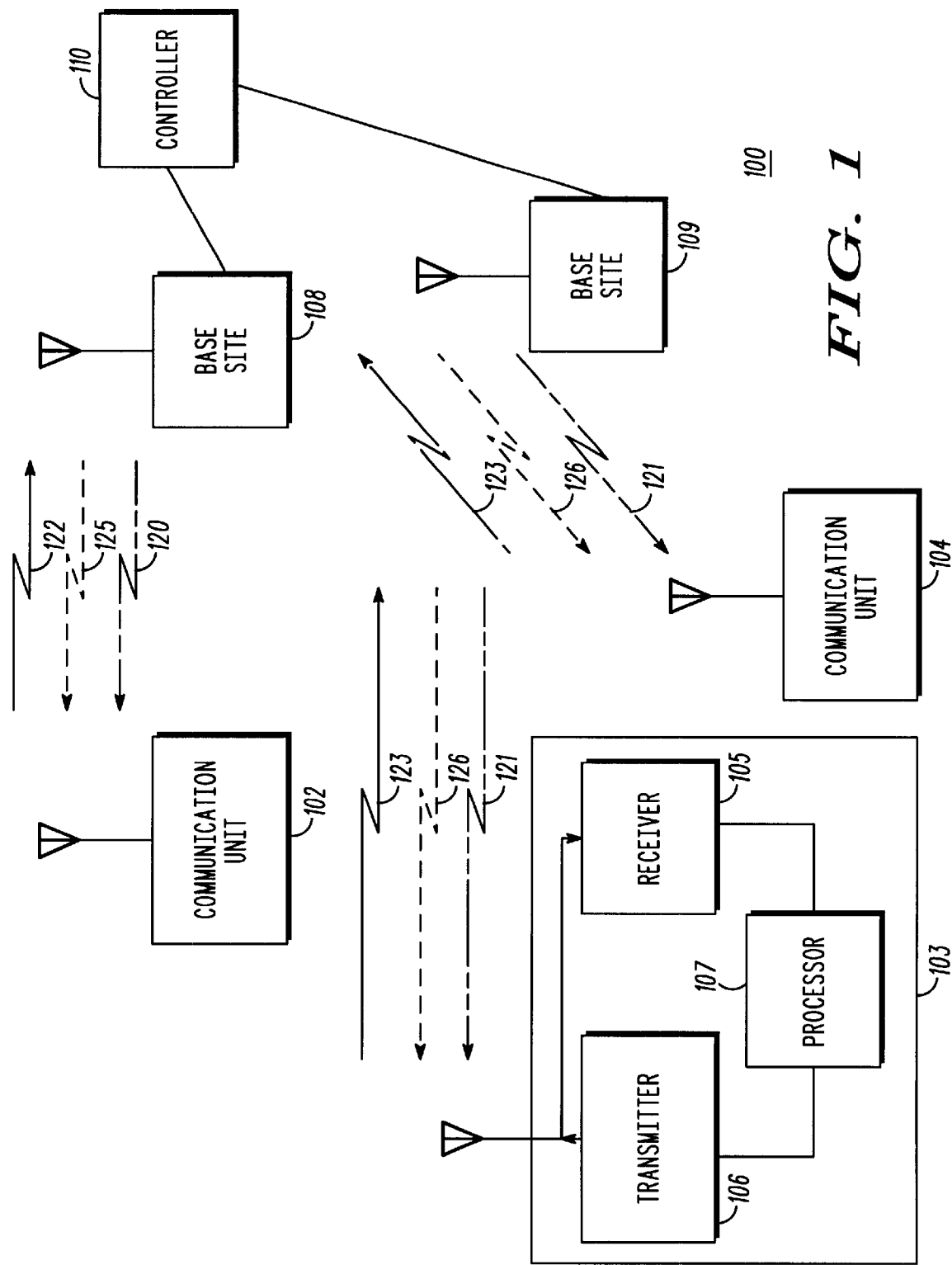
FIG. 1 is a block diagram depiction of a communication system in accordance with a preferred embodiment of the present invention.
Figure 2:
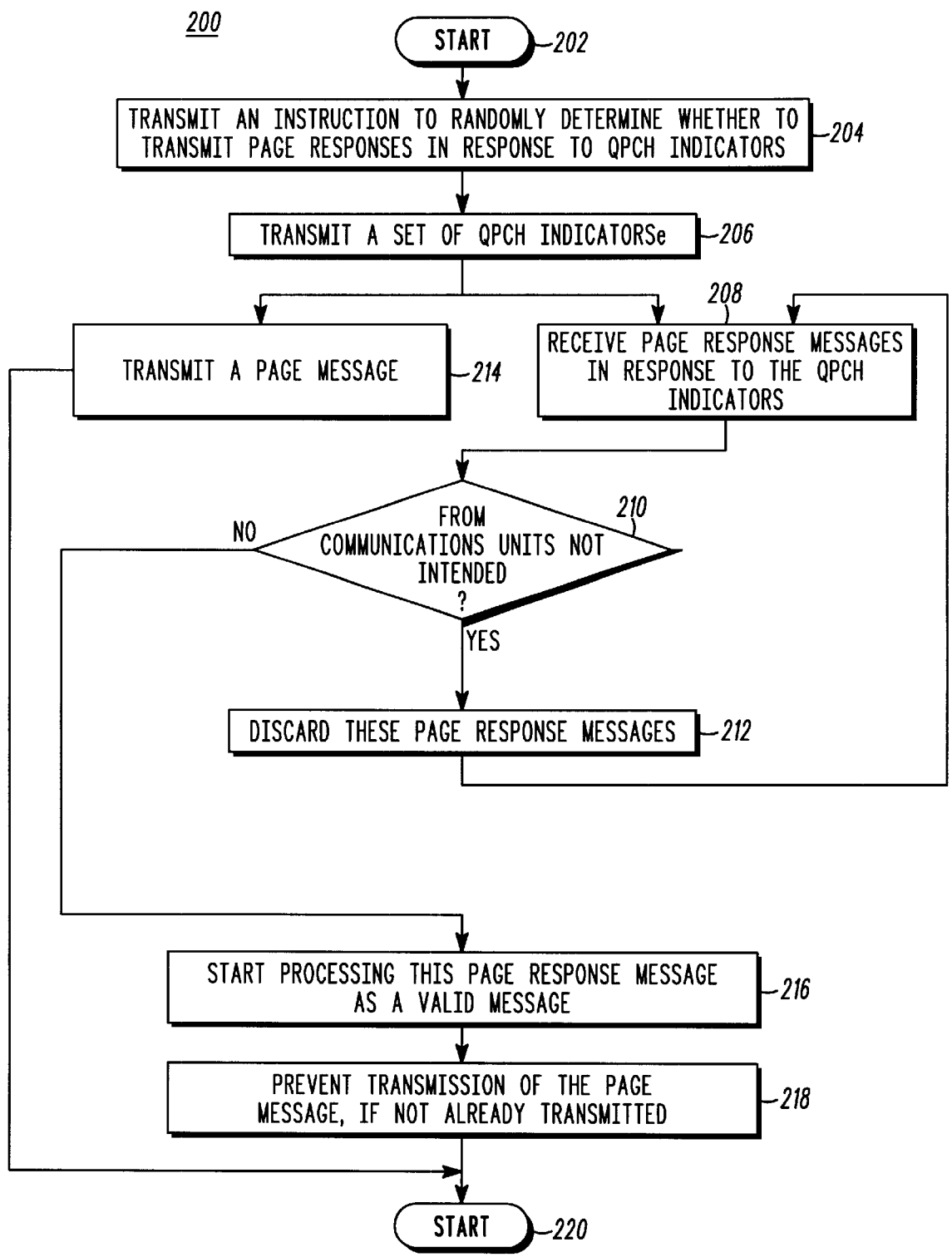
FIG. 2 is a logic flow diagram of steps executed by a communication infrastructure in accordance with a preferred embodiment of the present invention.
Figure 3:
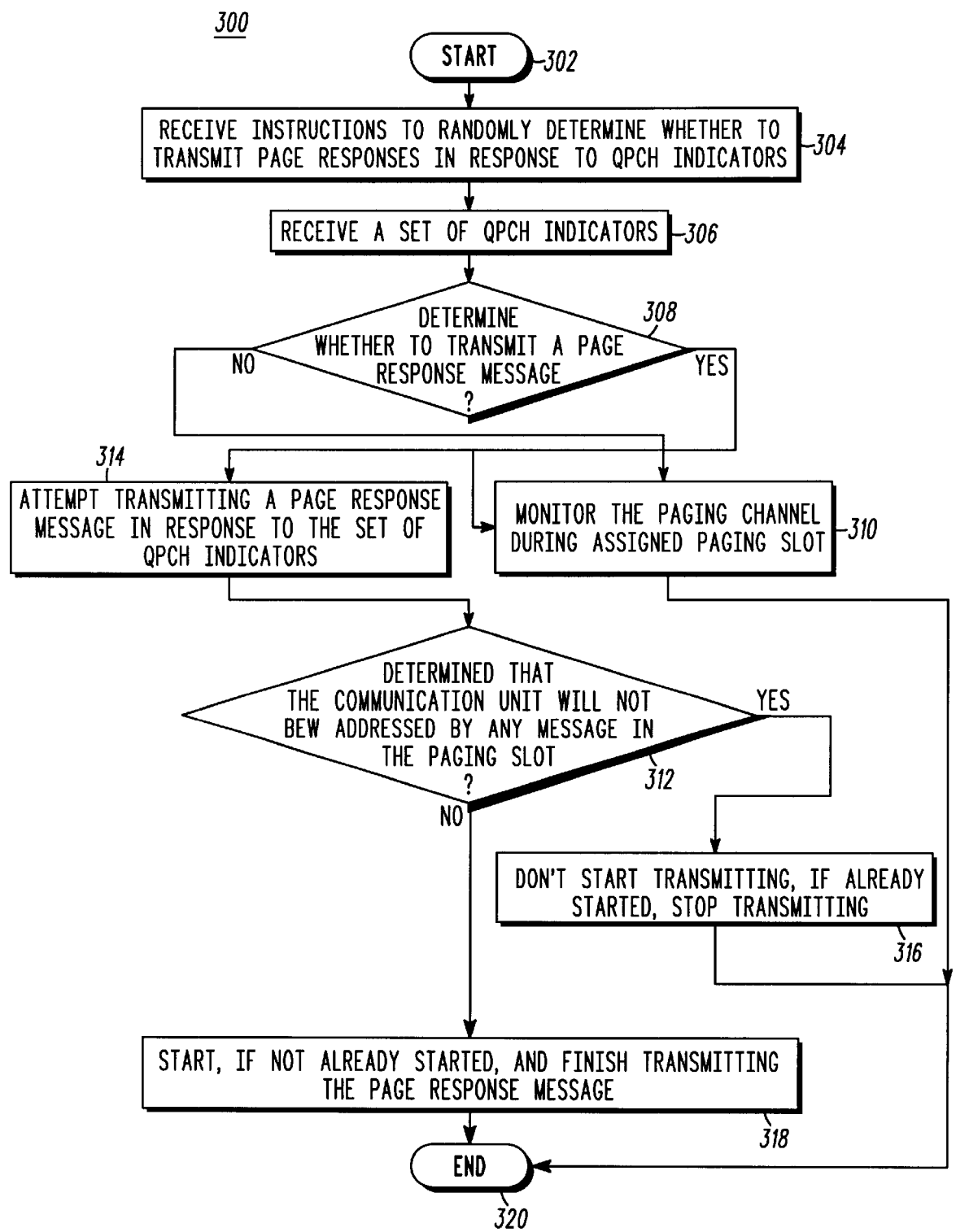
FIG. 3 is a logic flow diagram of steps executed by a communication unit in accordance with a preferred embodiment of the present invention.

The present invention can be more fully understood with reference to FIGS. 1–3. FIG. 1 is a block diagram depiction of communication system 100 in accordance with a preferred embodiment of the present invention. Preferably, communication system 100 is a system in accordance with the well-known Telecommunications Industry Association/Electronic Industries Association Interim Standard 2000 (TIA/EIA IS-2000 or CDMA 2000) modified as described below to implement the present invention.

System 100 comprises fixed network equipment and mobile communication units. The fixed network equipment, or communication infrastructure, includes base sites 108 and 109 and controller 110 that are preferably networked to other base sites, controllers, and switches, all part of the fixed network equipment of system 100 and all well known to those skilled in the art. For simplicity, only base sites 108 and 109 and controller 110 of the fixed network equipment is shown in FIG. 1. Again for simplicity, only three of what could be thousands of mobile communication units are shown in FIG. 1. Communication units 102–104 each preferably comprise CDMA-capable wireless phones that receive communications from base sites 108 and 109 via a CDMA air interface. Communication resources 120 and 121 each comprise a paging channel (PCH) of base sites 108 and 109, respectively. Communication resources 125 and 126 each comprise a quick paging channel (QPCH) of base sites 108 and 109, respectively. Lastly, communication resources 122 and 123 each comprise an access channel (ACH) of base sites 108 and 109, respectively.

Each of the communication units 102–104 comprises a common set of elements, a transmitter, a receiver, and a processor. In particular, processor 107 comprises one or more processing devices (e.g., microprocessors, digital signal processors, etc.) and memory devices and is coupled to transmitter 106 and receiver 105. Each of these elements is well-known in the art. In the preferred embodiment, under the control of software algorithms stored in the memory devices of processor 107 and in cooperation with the other elements shown, the processor 107 performs those tasks required for operation of communication unit 103, including the method described relative to FIG. 3.

Base sites 108 and 109 and controller 110 also comprise elements well-known in the art such as transmitters, receivers, and a processors. In the preferred embodiment, under the control of software algorithms stored in the memory devices of base sites 108 and 109 and controller 110, the communication infrastructure performs those tasks required for operation, including the method described relative to FIG. 2. While depicted as a separate box in FIG. 1, the physical implementation of controller 110 may take many forms, all well-known to those skilled in the art. For example, the logical control functions performed by controller 110 may be physically distributed among processors on multiple physical platforms, physically distributed among the processors of the base sites, or physically performed by a processor on a single physical platform.

Operation of preferred communication system 100, in accordance with the present invention, occurs substantially as follows. Controller 110 instructs base sites 108 and 109 to transmit an indication that the communication infrastructure will transmit a page addressed to at least one communication unit of a group of communication units in a paging slot but that does not indicate specifically which communication unit will be addressed. Preferably, this indication is transmitted via QPCHs 125 and 126. Alternatively, however, this indication may take the form of the first frame of a partial address comparison message that, unlike an indication transmitted via a QPCH, is encoded, interleaved, CRC-protected, and transmitted on either forward common control channels or PCHs 120 and 121. Partial address comparison messages are discussed in detail in U.S. Pat. No. 6,072,987, entitled "METHOD FOR TRANSMITTING AND RECEIVING ADDRESS INFORMATION WITHIN A COMMUNICATION SYSTEM." In the preferred embodiment in which a QPCH indication is transmitted, the group of communication units indicated is a paging hash group. Each such paging hash group is comprised of the communication units whose hashed IDs produce the same result.

Communication unit 103, for purposes of illustration, will be assumed to be a member of one of the groups indicated in the transmission. Thus, receiver 105 receives the indication that base site 109 will transmit, in the corresponding paging slot, a page addressed to one or more communication units in unit 103's paging hash group. In response to this indication, but without knowing whether a page addressed to unit 103 will actually be transmitted, processor 107 instructs transmitter 106 to transmit a page response message to base site 109 via ACH 123. Unit 103 transmits the page response without receiving an indication that a page will be addressed to it. In effect, this is a page response without a page or even an indication that such a page will definitely be sent. Preferably, the service option in the page response message indicates a dispatch service. Since unit 103 has not received the page message that this page response corresponds to, unit 103 "guesses" that the page will be for a dispatch service to shorten the dispatch call-setup.

Base site 109 receives the page response message from unit 103 and determines whether unit 103 is actually addressed by any of the page messages in the paging slot. If unit 103 is not addressed, base site 109 determines that the page response message is false or invalid and preferably ignores it or discards it. If, instead, unit 103 is addressed, base site 109 determines that the page response message is valid and processes it accordingly. Shortly after base site 109 preferably transmitted the QPCH indication, it began transmitting via PCH 121 the paging slot's page messages. If base site 109 receives a page response message and determines that it is valid and has not yet transmitted the page message addressed to unit 103 in the paging slot, base site 109 preferably prevents the transmission of the page message. Base site 109 continues the processing of the page response message as if it were received after the sending of the page on PCH.

After unit 103 receives the QPCH indicator, it proceeds to monitor the paging slot while attempting to transmit the page response message. Because unit 103 may be delayed in transmitting the page response message on ACH 123, unit 103 may begin receiving page messages in the paging slot before transmitting the page response message. When none of the page messages received are addressed to unit 103 and unit 103 determines that none of them will be (either by receiving them all or based upon page slot content indicators or message ordering), unit 103 preferably either prevents the transmission of the page response message or truncates its transmission. By doing this, unit 103 saves some RF capacity and relieves the base site 109 from having to determine that the page response message is invalid.

The base sites of communication system 100 will receive a significant number of false page responses that will all require processing to determine their invalidity. To address this potential problem, the preferred embodiment allows base sites to transmit an indication (e.g., an information element in the broadcast system overhead messages) to communication units to randomly determine whether to transmit page response messages in response to QPCH indications. This message would also preferably include an indication of how to weight the random determination either in favor of transmitting the page response message or in favor of not transmitting the page response message. For example, this indication of weighting may be a percentage of time that the communication units should randomly determine to transmit a page response message rather than not. A communication unit receiving such a message would perform this random determination step each time before proceeding to transmit a page response message in response to a QPCH indication. Thus, the base site can dynamically adjust the expected average number of false page responses that it must process in response to system loading. Finally, in an alternative embodiment, communication units may simply be ordered not to transmit page response messages in response to QPCH indications.

FIG. 2 is a logic flow diagram of steps executed by a communication infrastructure in accordance with a preferred embodiment of the present invention. Logic flow 200 begins (202) when the infrastructure indicates to communication units to transmit page response messages in response to QPCH indicators. For a particular paging slot, the infrastructure then transmits (206) the QPCH indicators of what paging messages will be transmitted. At this point, the infrastructure begins transmitting (214) the paging messages for the paging slot while simultaneously receiving (208) page response messages from communication units responding to the QPCH indicators. Page response messages from communication units that are not addressed by any of the paging messages in this paging slot are discarded (210 and 212). When (210) a page response message from a communication unit that is addressed by one of the paging messages in this paging slot is received, the infrastructure begins processing (216) it as a valid response. The infrastructure also prevents (218) the transmission of the corresponding page message if it has not already been transmitted. Logic flow 200 then ends (220).

FIG. 3 is a logic flow diagram of steps executed by a communication unit in accordance with a preferred embodiment of the present invention. Logic flow 300 begins (302) when the communication unit receives (304) a message instructing it to transmit page response messages in response to QPCH indicators. For a paging slot that the communication unit monitors, the unit receives (306) the QPCH indicators of what paging messages will be transmitted in the paging slot. Assuming that the indicators were unambiguously received and that they indicate that the communication unit is one of a group of units of which some will be addressed by paging messages, the communication unit determines (308) whether it should transmit a page response message.

If it determines that it should not transmit a page response, then it proceeds to monitor (310) its paging slot. Instead, if it determines that it should transmit a response, the unit attempts (314) to transmit the page response message while simultaneously proceeding to monitor (310) its paging slot. In either case, then, the unit proceeds to monitor its paging slot, and should (312) it receive a paging message addressed to it, it would transmit (318) a page response message. If (312), however, the communication unit determines from monitoring the paging slot that it will not be addressed by any paging messages in the slot, it either stops (316) transmitting the page response message or prevents the transmission from starting. Logic flow 300 then ends (320).

While the present invention has been particularly shown and described with reference to particular embodiments thereof, it will be understood by those skilled in the art that various changes in form and details may be made therein without departing from the spirit and scope of the present invention.

What is claimed is:

1. A method for a communication unit to shorten call-setup time comprising the steps of:

receiving, by the communication unit from a communication infrastructure, an indication that the communication infrastructure will transmit a page addressed to at least one communication unit of a group of communication units in a paging slot but that does not indicate specifically which communication unit will be addressed, wherein the communication unit is a member of the group;

transmitting, by the communication unit to the communication infrastructure, a page response message in response to the indication;

receiving, by the communication unit from the communication infrastructure, at least one page message in the paging slot addressed to a communication unit in the group after receiving the indication but before the step of transmitting the page response message in response to the indication; and determining, by the communication unit, whether the at least one page message was addressed to the communication unit, wherein the step of transmitting the page response message in response to the indication comprises the step of preventing the transmission of the pace response message in response to the indication, when none of the at least one page message is determined to be addressed to the communication unit.

2. The method of claim 1 wherein the step of transmitting the page response message in response to the indication comprises the steps of:

beginning to transmit the page response message in response to the indication; and stopping before completing the transmission of the page response message when none of the at least one page message is determined to be addressed to the communication unit.

3. The method of claim 1 wherein the indication is in the first frame of a partial address comparison page message.

4. The method of claim 1 wherein a service option is indicated in the page response message.

5. The method of claim 4 wherein the service option indicated is a dispatch service.

6. A method for a communication unit to shorten call-setup time comprising the steps of:

receiving, by the communication unit from a communication infrastructure, an indication that the communication infrastructure will transmit a page addressed to at least one communication unit of a group of communication units in a paging slot but that does not indicate specifically which communication unit will be addressed, wherein the communication unit is a member of the group;

transmitting, by the communication unit to the communication infrastructure, a page response message in response to the indication, wherein the step of transmitting the page response message in response to the indication comprises the steps of:

receiving an indication to randomly determine whether to transmit the page response message in response to the indication;

randomly determining whether to transmit the page response message; and transmitting the page response message when the random determination is to transmit.

7. The method of claim 6 wherein the indication to randomly determine whether to transmit the page response message comprises an indication of how to weight the random determination either in favor of transmitting the page response message or in favor of not transmitting the page response message.

8. A method for a communication infrastructure to shorten call-setup time, the method comprising the steps of:

transmitting, by the communication infrastructure, an indication that the communication infrastructure will transmit a page addressed to at least one communication unit of a group of communication units in a paging slot but that does not indicate specifically which communication unit will be addressed;

receiving, by the communication infrastructure from communication units not addressed, page response messages in response to the indication;

determining, by the communication infrastructure, that the page response messages are false page responses;

receiving, by the communication infrastructure from a communication unit addressed, a page response message in response to the indication; and determining, by the communication infrastructure, that the page response message is a valid page response;

preventing the transmission of a page message addressed to the communication unit from which the page response message determined valid was received.

9. The method of claim 8 wherein the indication is in the first frame of a partial address comparison page message, transmitted on a paging channel (PCH), encoded, interleaved, and protected by cyclical redundancy checking (CRC).

10. The method of claim 8 wherein the indication is in the first frame of a partial address comparison page message, transmitted on a forward common control channel (FCCH), encoded, interleaved, and protected by cyclical redundancy checking (CRC).

11. A method for a communication infrastructure to shorten call-setup time, the method comprising the steps of:

transmitting, by the communication infrastructure, an indication that the communication infrastructure will transmit a page addressed to at least one communication unit of a group of communication units in a paging slot but that does not indicate specifically which communication unit will be addressed;

receiving, by the communication infrastructure from communication units not addressed, page response messages in response to the indication; and determining, by the communication infrastructure, that the page response messages are false page responses;

transmitting, by the communication infrastructure, an indication that a communication unit should randomly determine whether to transmit a page response message in response to an indication that the communication infrastructure will transmit a page addressed to at least one communication unit of a group of communication units in a paging slot but that does not indicate specifically which communication unit will be addressed, wherein the communication unit is a member of the group.

12. The method of claim 11 wherein the indication that the communication unit should randomly determine whether to transmit a page response message comprises an indication of how to weight the random determination either In favor of transmitting the page response message or in favor of not transmitting the page response message.

13. A method for a communication infrastructure to shorten call-setup time, the method comprising the steps of:

transmitting, by the communication infrastructure, an indication that the communication infrastructure will transmit a page addressed to at least one communication unit of a group of communication units in a paging slot but that does not indicate specifically which communication unit will be addressed:

receiving, by the communication infrastructure from communication units not addressed, page response messages in response to the indication; and determining, by the communication infrastructure, that the page response messages are false page responses;

transmitting, by the communication infrastructure, an indication that a communication unit should not transmit a page response message in response to an indication that the communication infrastructure will transmit a page addressed to at least one communication unit of a group of communication units in a paging slot but that does not indicate specifically which communication unit will be addressed, wherein the communication unit is a member of the group.

14. A communication unit comprising:

a receiver arranged to receive an indication that a communication infrastructure will transmit a page addressed to at least one communication unit of a group of communication units in a paging slot but that does not indicate specifically which communication unit will be addressed, wherein the communication unit is a member of the group;

a transmitter, coupled to the processor, arranged to transmit a page response message; and a processor, coupled to the receiver and the transmitter, arranged to instruct the transmitter to transmit the page response message in response to the indication, wherein the receiver is further arranged to receive at least one page message in the paging slot addressed to a communication unit in the group after receiving the indication but before the transmitter transmits the page response message in response to the indication and wherein the processor is further arranged to determine whether the at least one page message was addressed to the communication unit, wherein the processor is further arranged to prevent the transmission of the page response message in response to the indication when none of the at least on page message is determined to be addressed to the communication unit.

15. The method of claim 14 wherein the transmitter is further arranged to begin transmitting the page response message but to stop transmitting the page response message before completing transmission when none of the at least one page message is determined to be addressed to the communication unit.

16. A communication infrastructure comprising:

a base site arranged to transmit an indication that the communication infrastructure will transmit a page addressed to at least one communication unit of a group of communication units in a paging slot but that does not indicate specifically which communication unit will be addressed, arranged to receive page response messages in response to the indication from communication units not addressed, and arranged to determine that the page response messages are false page responses; and a controller, coupled to the base site, arranged to instruct the base site to transmit the indication, wherein the base site is further arranged to receive from a communication unit addressed a page response message in response to the indication, to determine that the page response message is a valid page response, and to prevent the transmission of a page message addressed to the communication unit from which the page response message determined valid was received.

17. The communication infrastructure of claim 16 wherein the indication is transmitted via a quick paging channel (QPCH).

18. The communication infrastructure of claim 16 wherein the base site is further arranged to transmit at least one page message in the paging slot addressed to a communication unit in the group after transmitting the indication.

* * * * *